en
to
co
fir
Th
en
co
po
po
wit in
fo
ro
ta
va
be
an
im
in
m
liv
su
m
clo to
no
in
re
le
to
a
u an
va
lo
tim
ca
th
los
of
su an
va
cu
pe
of
ca a
th
in plied to an internal combustion engine of the spark ignition type which may be used for various purposes, such as for an aircraft, automotive, marine or industrial engine. For most uses the engine is of the multi-cylinder type. However, for the purposes of simplicity a single cylinder unit of the engine is illustrated in the present embodiment, it being understood that the remaining cylinders of the engine are identical to the structure herein shown and described.

Referring particularly to Fig. 1, the present engine comprises a cylinder 10 which is rigidly secured at its inner end to the crankcase within which is mounted a crankshaft supported in bearings according to conventional practice. Mounted to reciprocate within the cylinder is a piston 11 adapted to be connected in the usual manner by a connecting rod to the crankshaft. In the present instance the upper or outer end of the cylinder is threaded into a recess in a cylinder head 12 which may be cooled in any suitable manner, such as by means of cooling fins 12a.

In the present engine the combustion chamber of the cylinder is formed principally within a rotor or rotary valve 13 which comprises a frusto-conical body arranged immediately above the piston when at the top of its stroke. The rotary valve 13 fits within a substantially correspondingly shaped frusto-conical cavity or recess 14 in the cylinder head 12. The bottom or inner wall of the valve is preferably tapered so as to correspond substantially to the taper of the piston head, the construction in the present embodiment being such that the piston head will approach very closely the bottom of the valve when the piston is at the outer end of its stroke.

The valve 13 is formed with a side port 15 communicating with the combustion chamber 16 in the valve and adapted to register successively during rotation of the valve with aa spark plug at 17, an exhaust passage or conduit 18, and an intake conduit or passage 19 in the cylinder head, the direction of rotation of the valve being indicated by the arrows in Figs. 2, 8 and 9. In addition to the side port 15 the valve 13 has a central port or bottom opening 20 at its inner end communicating with the cylinder. The valve is also formed with a cooling chamber 21 extending entirely around the combustion chamber 16 of the valve. This cooling chamber is adapted to receive any suitable cooling medium such, for example, as metallic sodium, which is sealed into the chamber by means of an expanding plug 22.

In the present embodiment the valve or rotor 13 is driven at one-half engine or crankshaft speed. It is provided with a projecting stem 23 through the medium of which the driving mechanism for the valve is connected. The valve housing of the cylinder head is provided with an annular recess 24 in its outer end through which the valve stem 23 extends. Within this recess is located a cup-shaped spring retainer member 25 adapted to receive a compression spring 26 surrounding the valve stem 23. The outer end of the spring engages a steel coupling disk 27. This disk is formed centrally thereof with an annular set of teeth 28 meshing with corresponding teeth formed on the end of the valve stem 23. The valve stem is tapped to receive a threaded stud or bolt 29 which carries a nut 29a engageable with the coupling disk 27 and adapted to be tightened to draw down the teeth and maintain the teeth 28 in constant mesh with the teeth on the outer end of the valve stem. The spring 26 is, therefore, held under constant compression so as to yieldingly hold the valve upwardly within the frusto-conical recess 14 in the valve housing. The strength of this spring and the amount of preloading thereof is such that the effort exerted by the spring to raise the valve within the valve cavity or recess 14 is sufficient to substantially offset or equal the effort exerted during the suction stroke of the piston to draw the valve downwardly and away from its seat.

The coupling disk 27 is provided with external teeth 30 meshing with internal teeth 31a on a ring gear 31. This gear in turn has external teeth 31b meshing with the teeth of a valve driving gear 32 secured to a longitudinally extending top shaft 33. The cylinder head is formed with a housing 34 provided with a removable closure 35 for housing the driving mechanism located in the cylinder head. It will be understood that the top shaft 33 is drivingly connected in suitable manner to the crankshaft of the engine.

In the present embodiment of the invention the principal bearing loads between the rotor or valve 13 and the cylinder head 12 is taken substantially entirely at two localities entirely above and below the side port 15. The valve is provided with an annular or circumferential relief or recessed area 50 extending around the central or intermediate portion of the valve and having a height preferably corresponding to the height of the side port 15. Although in the present instance the relief area is shown in the valve, it will be understood that it may be formed in the cylinder head and may be filled with a layer of carbon thereby providing a bearing and sealing medium around the valve in the height of the side port not requiring any direct lubrication.

In accordance with the present invention improved lubricating means is provided for the cooperating bearing surfaces of the valve and cylinder head above and below the relief area 50. This lubricating means is so devised as to deliver to the bearing surfaces the correct amounts of oil needed for adequate lubrication. Moreover, in view of the fact that the bearing surfaces above the relief 50 are required to sustain greater bearing loads than the bearing surfaces below the relief, the present lubricating system is so devised as to deliver more lubricating oil to the upper bearing surfaces than to the lower bearing surfaces. In other words, the present invention provides a means by which lubricating oil may be delivered to separated bearing surfaces of the valve substantially in accordance with the loads imposed upon such surfaces during operation.

The upper or outer smaller end of the valve 13 is provided with an oil groove 36 on its outer surface. This groove is preferably zigzag in form having longitudinally or axially spaced parallel portions connected by inclined portions as clearly shown in Fig. 7. The circumferentially spaced portions 36a and 36b of the oil groove are disposed furthest from the relief 50 and lie equidistant from the upper edge thereof. The circumferentially spaced portions 36c and 36d of the valve are disposed relatively close to the relief 50 and are also equidistant from the upper edge thereof. Communicating with the groove portion 36b is a secondary groove portion 36e which extends parallel to the groove 36b and somewhat nearer the upper edge of the relief 50. This secondary groove portion 36e, which is utilized as a means for intermittently conveying lubricating oil to the lower bearing surface of the valve, may be somewhat shorter in a circumferential direction than the groove portion 36b, although the rel
30
it
to in
sa
to
sa
up
du
up
or
vi
wh
va
to
ti
va
a
p
o
th
oi
Th
ve
du
op
in
le
int
co
of
th
th
43
inn
co
su
cy
oil
or
lub
wal
the
an
pa
cy
al
fr
u
sh
po
vi
pa
fac
ca
wit
va ro
an
oil
oil
po
co
wi
du
po
tha
giv
the
oil
or
val for conveying oil from said passage to a circumferential oil groove in the valve located adjacent one end of the valve, conduit means having the major portion of the length thereof entirely confined within said body for conveying oil from said groove to an oil groove in the body located adjacent the opposite end of the valve, and oil outlet conduit means adapted to communicate with said oil groove.

4. In an internal combustion engine, a rotatable valve, a body within which said valve rotates, conduit means for conveying oil at predetermined intermittent intervals of time to an oil groove located in the valve at one locality thereof, and conduit means for conveying oil from said oil groove at intervals of time different from the aforesaid intervals of time to juxtaposed bearing surfaces of the valve and body at another locality of the valve.

5. In an internal combustion engine, a rotatable valve, a body within which said valve rotates, conduit means for conveying oil at predetermined intermittent intervals of time to an oil groove located in the valve at one locality thereof, conduit means for conveying oil from said oil groove at intervals of time different from the aforesaid intervals of time to juxtaposed bearing surfaces of the valve and body at another locality of the valve, and oil outlet conduit means adapted to communicate with said oil groove.

6. In an internal combustion engine, a rotatable valve, a body within which the valve rotates, a circumferential zig-zag oil groove located in the valve at one locality thereof, inlet oil conduit means communicating intermittently with circumferentially spaced portions of said groove, and oil conduit means adapted to communicate with one but not another of said portions for conveying oil to a valve bearing surface at another locality of the valve.

7. In an internal combustion engine, a rotatable valve, a body within which the valve rotates, a circumferential zig-zag oil groove located in the valve at one locality thereof, inlet oil conduit means communicating intermittently with circumferentially spaced portions of said groove, oil conduit means adapted to communicate with one but not another of said portions for conveying oil to a valve bearing surface at another locality of the valve, and outlet oil conduit means adapted to communicate intermittently with spaced portions of said groove other than the aforesaid portions.

8. In an internal combustion engine, a rotatable valve body, a body within which the valve body rotates, an oil inlet conduit, oil groove portions located in one of said bodies between juxtaposed bearing surfaces thereof effecting intermittent communication with said oil inlet conduit, and oil conduit means having the major portion of the length thereof entirely confined within said body and communicating intermittently with one of said groove portions for conveying oil to another locality of the valve bearing surface.

9. In an internal combustion engine, a rotatable valve body, a body within which the valve body rotates, an oil inlet conduit, oil groove portions located in one of said bodies between juxtaposed bearing surfaces thereof effecting intermittent communication with said oil inlet conduit, oil conduit means having the major portion of the length thereof entirely confined within said body and communicating intermittently with one of said groove portions for conveying oil to another locality of the valve bearing surface, and an oil outlet conduit intermittently communicating with said oil groove portions.

10. In an internal combustion engine, a rotatable valve, a body within which the valve rotates, oil groove portions located in the valve adjacent one end thereof, inlet oil conduit means intermittently communicating with said portions, and conduit means having the major portion of the length thereof entirely confined within said body and communicating intermittently with one of said portions for conveying oil to the valve bearing surface adjacent the opposite end of the valve.

11. In an internal combustion engine, a rotatable generally frusto-conical valve, a body within which the valve rotates, an oil inlet conduit in said body, means effecting intermittent communication between said conduit and zig-zag oil groove means located in the valve, and means for intermittently conveying oil from said oil groove means to a second oil groove means spaced axially of the valve from said first oil groove means and located within juxtaposed bearing surfaces of the valve and body.

12. In an internal combustion engine, a rotatable generally frusto-conical valve, a body within which the valve rotates, an oil inlet conduit in said body, said valve having circumferentially spaced oil groove portions adjacent one end of the valve intermittently communicating with said conduit, an oil conduit in said body intermittently communicating with one of said portions for conveying oil to oil groove means adjacent the opposite end of the valve, and an outlet oil conduit in said body intermittently communicating with said oil groove means.

13. In an internal combustion engine, a rotatable generally frusto-conical valve, a body within which the valve rotates, an oil inlet conduit in said body, said valve having circumferentially spaced oil groove portions adjacent one end of the valve intermittently communicating with said conduit, an oil conduit in said body intermittently communicating with one of said portions for conveying oil to oil groove means adjacent the opposite end of the valve, and a plurality of outlet oil passages in said body one communicating intermittently with said oil groove means and all communicating intermittently with said oil groove portions simultaneously with the times when said oil inlet conduit communicates with said oil groove portions.

14. In an internal combustion engine, a rotatable valve, a body within which the valve rotates, said valve having a zig-zag oil groove having circumferential portions extending around the valve adjacent one end thereof and also having an oil groove portion communicating with and spaced from one of said circumferential portions, an oil inlet conduit in the body communicating intermittently with said circumferential portions, an oil conduit in the body communicating intermittently with said oil groove portion, and oil groove means adjacent the opposite end of the valve communicating with said last named conduit.

15. In an internal combustion engine, a rotatable valve, a body within which the valve rotates, said valve having a zig-zag oil groove having circumferential portions extending around the valve adjacent one end thereof and also having an oil groove portion communicating with and spaced from one of said circumferential portions, an oil inlet conduit in the body communicating intermittently with said circumferential portions, an oil [redacted] and [redacted] and [redacted]

[redacted] file [redacted]